Sept. 15, 1970     W. C. JOHNSON, JR     3,528,437
SOLDER REFLOWING DEVICE
Filed June 30, 1967     2 Sheets-Sheet 1
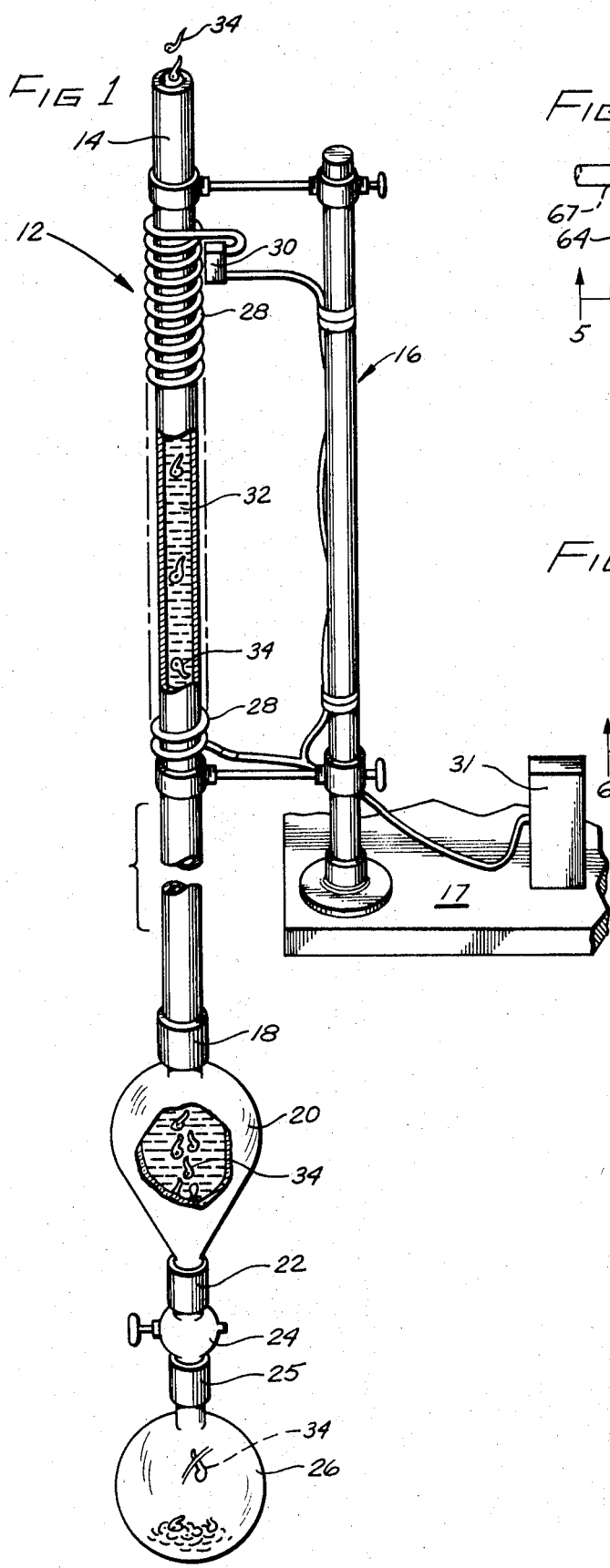
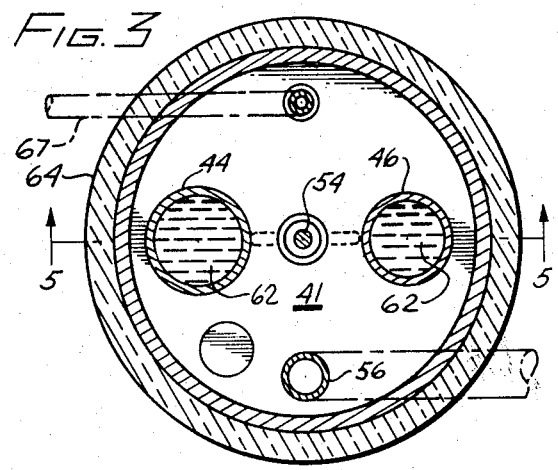
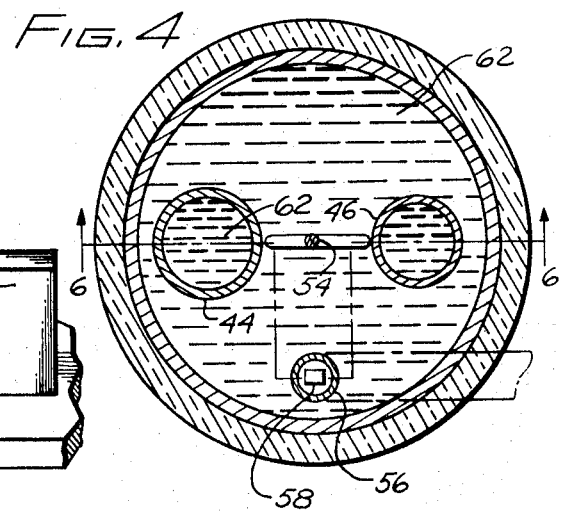
INVENTOR.
WENDELL C. JOHNSON, JR.
BY Thomas S. MacDonald
ATTORNEY Sept. 15, 1970     W. C. JOHNSON, JR     3,528,437
SOLDER REFLOWING DEVICE
Filed June 30, 1967     2 Sheets-Sheet 2
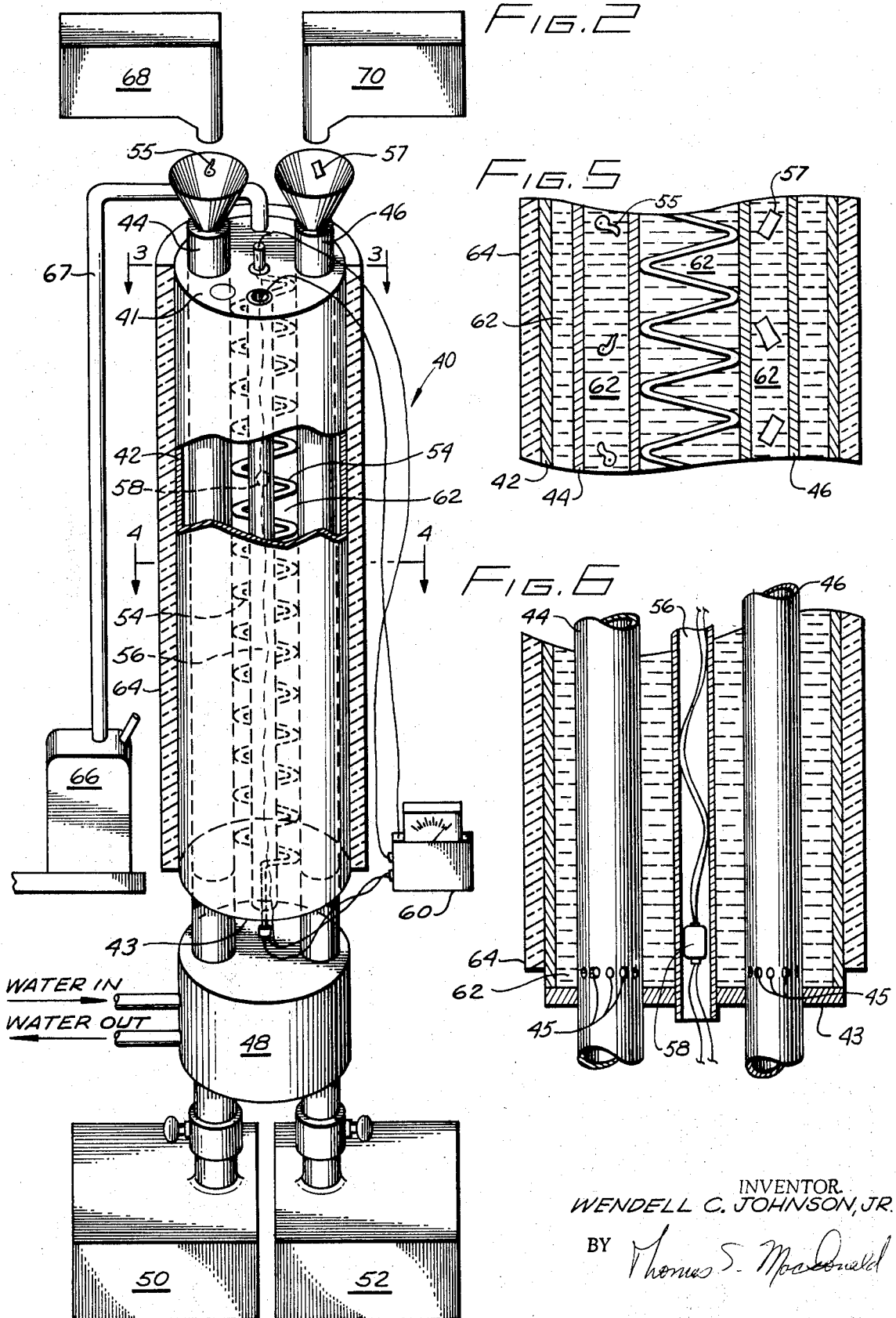
INVENTOR.
WENDELL C. JOHNSON, JR.
BY Thomas S. MacDonald
ATTORNEY

United States Patent Office 3,528,437
Patented Sept. 15, 1970

3,528,437
SOLDER REFLOWING DEVICE
Wendell C. Johnson, Jr., Agoura, Calif., assignor to North American Rockwell Corporation, a corporation of Delaware
Filed June 30, 1967, Ser. No. 650,533
Int. Cl. B05c 3/10
U.S. Cl. 134—107          9 Claims

ABSTRACT OF THE DISCLOSURE

An apparatus for reconditioning partially deteriorated solder deposited on metal parts by reflowing the solder as the articles are descended through a vertical tube containing a viscous fluid. Fluid in the upper portion of the tube is sufficiently heated to cause reflowing of the solder and as the part descends, cooler fluid in the lower portion of the tubes resolidifies the solder.

BACKGROUND OF THE INVENTION

The invention described herein was made in the performance of work under a NASA contract and is subject to the provisions of Section 305 of the National Aeronautics and Space Act of 1958, Public Law 85–268 (72 Stat. 435; 42 USC 2457.

Presoldered parts such as connectors are widely used in the electronics industry. Stringent quality standards must often be satisfied by pretinning, i.e. presoldering connectors and the like due to the varied environmental surroundings in which they are to be used. For example, in the aerospace industry, electrical terminals must withstand temperatures well into the cryogenic zone. Presoldered terminals must be free of contaminants and defects, such as oxide films or perpheral cracks, which can cause structural and electrical discontinuities. These defects and contaminants can develop during storage. This adverse condition is especially undesirable in cryogenic environments. Hence, reflowing of pretinned terminals is necessary prior to use.

The most common solder deposition method is the electrodeposited technique. This method assures a good intermetallic surface between the base metal and the solder. However, the pretinned or presoldered part produced by this method has a highly porous surface which when exposed for long periods of time to the atmosphere readily oxidize. Because of this phenomenon, it is necessary to reflow the deposited solder on the article. A number of processes have been employed to accomplish this. For example, pursuant to a presently practiced method the parts to be reflowed are placed in a wire mesh fixture, the apertures of which are shaped to accept a particular part, and hand dipped in hot oil. The resulting reflowed parts are frequently marred by physical contact of the terminals and the like with the fixture. The foregoing method also causes uneven distribution of solder on the parts due to gravitational flow of the hot reflowed solder and the capillary action of the articles interacting with the holding fixture.

A further method of reflowing presoldered parts is to place the parts in a steel wire basket and then to dip them into hot oil. The parts are then shaken into a collection bin and stirred to keep them separated, thus preventing fusion of the parts. In order to gain time to perform the operation, the parts are generally overheated, e.g. 600–700° F. A serious problem is introduced when such overheating occurs. If, for example, pretinned terminals are reflowed and overheated, the low melting constituents of the alloy in the terminals tend to precipitate out. These low melting alloys amalgamate with the tin/lead coating. This phenomenon changes the melting range of tin/lead, due to the induced impurities from overheating. The longer the parts to be reflowed are held at excessive temperatures, the more severe the problem becomes. Generally, when tin/lead solder is overheated the tin precipitates out cousing a "grainy" appearance to the part which is a cause for rejection of the article.

As can be realized, the rejection rate of reflowed presoldered parts is relatively high when the foregoing prior art methods are used.

SUMMARY OF THE INVENTION

The instant invention contemplates a process and apparatus for reflowing electrodeposited terminals or the like to remove surface irregularities due to oxidation, cracks and uneven depositions. A series of parts to be reflowed are successively deposited into the top of a vertical tube containing a heatable liquid such as peanut oil. A heating element is provided for heating the liquid in the upper tube portion. Liquid in the upper portion of the tube is heated to a temperature sufficient to cause reflowing of solder, while the liquid in the lower portion of the tube is maintained at temperatures below the reflowing temperature of the solder.

As the parts to be reflowed gravitationally descend through the liquid in the container, they are first reflowed as they pass through the heated liquid and then resolidified as they gradually descend through the lower portion of the tube. A collection trap is attached to the bottom of the container to collect parts exiting from the tube.

In accordance with a preferred embodiment of the invention, an advantage over the prior art is realized in that the parts being reflowed rarely come in physical contact with any portion of the apparatus prior to their resolidification. Therefore, there is no capillary action due to contact with a holding fixture. Furthermore, there is no uneven deposition of solder because the parts are surrounded by viscous fluid as they slowly descend into the collection trap. In addition, contaminance or "slag" floats to the top of the tube. Thus, there can be no recontamination of the parts as they are being reflowed. A further advantage is realized in that the reflowed parts cannot adhere to one another in the collection trap due to the fact that the parts are completely resolidified before they reach the collection trap.

In an alternative embodiment, the container is slightly inclined. Although there will be an increased frequency of contacts between the articles being reflowed and the inside wall of the container, the arrangement is superior to prior art devices.

DESCRIPTION OF THE DRAWINGS

The above noted objects and further advantages of the instant invention will be more fully understood upon study of the following detailed description in conjunction with the detail drawings in which:

FIG. 1 is a perspective view shown partly in cross section of one embodiment of the invention;

FIG. 2 is a perspective view of another embodiment of the invention shown partly in cross section;

FIG. 3 is a top view taken along lines 3—3 of FIG. 2;

FIG. 4 is a section view taken along lines 4—4 of FIG. 2;

FIG. 5 is a side elevational sectional view of the heating element taken along line 5—5 of FIG. 3;

FIG. 6 is a side elevational view of the instrumentation pipe taken along line 6—6 of FIG. 4.

DESCRIPTION OF THE PREFERRED EMBODIMENTS

Referring now to FIG. 1, there is illustrated a solder reflowing apparatus 12 in its simplest form. The apparatus 12 includes a container or pipe 14 that is preferably oriented vertically. Pipe 14 may be constructed from stainless steel and is supported by a holding fixture 16 which is anchored to a base 17. The upper portion of pipe 14 is surrounded by a helically wound heating coil 28 which is connected to an electrical source 31. Heat generated by coil 28 is controlled by a thermostat or thermister 30. The lower end of pipe 14 consists of a coupling 18, a reservoir 20 and a coupling 22 which is affixed to valve 24. Immediately below the valve 24 is an additional coupling 25 which is attached to collection trap 26. Vertical pipe 14 is completely filled with a viscous liquid such as peanut oil having a viscosity of between about 70 centipoise and 80 centipoise at 20° C. Other suitable liquids are glycerin, mineral oil, olive oil, and cotton seed.

In operation, the parts 34 to be reflowed, for example presoldered electrical terminals, are dropped into the top of pipe 14. Oil 32 is maintained at a temperature of approximately 400 to 500° F. by the coil 28. Oil 32 is characterized by a viscosity sufficient to permit parts 34 to descend at a rate allowing the heated oil to reflow the solder of parts 34. For greater viscosity the heat could be decreased and vice versa. As long as the parts 34 are immersed in the heated oil long enough to become reflowed, the advantages of the invention can be realized. As the articles further descend and pass through the heated portion of the tube, they are allowed to slowly cool in the lower portion of the tube as they move toward collection trap 26. It should be pointed out that the distance from the bottom of the heating element 28 to the reservoir 20 and the temperature in the lower tube portion are sufficient to allow reflowed parts 34 to become completely resolidified. Because pipe 14 is vertical, it can be seen that the reflowed parts 34 will rarely come into physical contact with its walls. The heretofore described apparatus of FIG. 1 is a continuous operation requiring no manual handling of the parts 34 as they are being treated.

When collection trap 26 is full, valve 24 is shut off, and the trap 26 is removed to a location where the reflowed parts 24 may be unloaded. Trap 26 is then reconnected and valve 24 is reopened so that the process can be repeated. Any loss of liquid can be made up by refilling the tube from the top to the desired operating level.

The apparatus of FIG. 2, generally designated as 40 comprises a pair of shaker bins 68 and 70; an enclosed cylinder 42 with a pair of parallel upright pipes 44 and 46 which are longer than cylinder 42. A heat exchanger 48 and a pair of collection traps 50 and 52 are also provided.

A heating element 54 passes through a top plate 41 into cylinder 42 and is disposed between pipes 44 and 46 generally in a zig zag or helical pattern exiting through a bottom plate 43. An instrumentation pipe 56 paralleling pipes 44 and 46 traverses the length of cylinder 42. Within instrumentation pipe 56 is disposed a series of thermocouples or thermisters 58 which are electrically connected to a temperature control box 60. The thermocouples or the like serve the function of controlling and monitoring the temperature of the viscous oil 62 confined within cylinder 42 and pipes 44 and 46. Cylinder 42 is surrounded by a layer of insulation 64 so it can effectively retain heat generated within the enclosure. Shaker bins 68 and 70 are provided to control the rate of introduction of the parts to be reflowed into pipes 44 and 46. Heat exchanger 48 serves to more rapidly cool the oil in the lower portions of pipes 44 and 46 thus effectively reducing the overall length of the apparatus 40.

To operate the solder reflowing device as a closed system, a small reservoir 66 connected by overflow pipes 67 is provided to collect the thermally expanded liquid during operation. When the apparatus cools down the closed system enables the fluid to return to cylinder 42 by a siphoning mechanism.

FIG. 3 is a view looking down on upper plate 41 of cylinder 42. This figure illustrates the location of the various components within cylinder 42.

FIG. 4 is a view taken through cylinder 42 showing the oil filled cavity; vertical pipes 44 and 46 and their relationship to heated coil 54. In addition, instrumentation pipe 56 is shown in cross section with thermocouple 58 contained therein.

FIG. 5 more clearly illustrates the relationship of pipes 44 and 46 to the heating element 54. Pretinned parts 55 and 57 are shown in a spaced relationship as they descend pipes 44 and 46. The spacing is regulated by shaker bins 68 and 70.

FIG. 6 is a cross section through the instrumentation pipe illustrating one of the thermocouple or thermisters 58 which control the temperature range of the apparatus. In addition apertures 45 in pipes 44 and 46 are means in which liquid enters said pipes.

In operation the articles from bins 68 and 70 are dropped into their respective pipes 44 and 46 at a controlled rate and are reflowed as they descend the cavity filled with oil, i.e. peanut oil, through the heated portion of the apparatus 40. The articles are allowed to cool as they pass through heat exchanger 48 eventually falling into collection traps 50 and 52.

The solder reflowing apparatus as illustrated in FIGS. 1 and 2 may be inclined to a degree such that the parts that are dropped into the apparatus gravitationally descend the tubes. While the articles would more frequently contact the inside diameter of the tubes, the end results would be satisfactory.

The pipes can be of different diameters to accept pretinned parts of various sizes. In addition, it is apparent that any number of pipe stands can be disposed within the cylinder limited only by the size of the cylinder and the capacity of the heating element.

It should be pointed out that there can be a variation of fluids contained within one or more pipes of the apparatus. For example, peanut oil can be disposed in the upper portion of the tube while the lower portion of said tube can be filled with water.

Since it is obvious that many changes and modifications can be made in the above-described embodiments without departing from this invention, it is to be understood that the scope of the invention is to be limited only by the appended claims.

I claim:
1. A device for succesively reflowing and resolidifying presoldered articles descending through a fluid comprising:
  a container for containing a substantially static volume of fluid, the container having imperforate vertical side walls and having an upper portion for receiving the articles and a lower potrion for collecting the articles,
  heating means for heating the fluid in the container upper portion sufficient to reflow solder, and
  cooling means for cooling said fluid and resolidifying the solder as the articles descend through the fluid in the container lower portion.
2. The device according to claim 1 wherein the container is a pipe oriented substantially vertically so as to minimize the number of contacts between the descending article and the interior walls of the pipe.
3. The device according to claim 1 further comprising:
  a collection means connected to the container lower portion for collecting presoldered articles as they exit the container lower portion.
4. The device according to claim 1 wherein the fluid is a liquid and said heating means is adapted to heat localized portions of said liquid to a temperature in the range of 400° to 500° F.
5. The device according to claim 1 further comprising a shaker bin for introducing the articles into the container upper poriton.
6. The device according to claim 1 wherein the con- tainer includes a plurality of pipes axially aligned and substantially of the same length for containing liquid.

7. The device according to claim 1 further comprising:
an overflow tube connected to the container upper portion for conducting away excessive fluid expanded by the heating means.

8. A device for successively reflowing and resolidifying presoldered articles descending through a liquid comprising:
a pipe for containing liquid, the pipe having an upper portion for receiving the articles and a lower portion for collecting the articles, the pipe being oriented substantially vertically so as to minimize the number of contacts between the descending articles and the interior walls of the pipe,
heating means for heating liquid in the pipe upper portion to a temperature sufficient to reflow solder, the solder then becoming resolidified as the articles descend through cooler liquid in the pipe lower portion, and
a collection trap connected to the pipe lower portion for collecting articles as they exit the pipe lower portion.

9. A device for successively reflowing and resolidifying metallic layers on articles passing through a fluid medium comprising:
a container for containing a substantially static volume of fluid, the container having an upper portion for receiving said articles and a lower portion for collecting the articles, said container being sized so that said articles freely descend therethrough,
means forming a heated zone within the upper portion of said container, the heat being sufficient to reflow the metallic layers on said articles as they pass therethrough,
means forming a cool zone within the lower portion of said container to cool the metallic layers on said articles as they pass therethrough so as to resolidify said metallic layers, and
control means to control the temperature in each of said zones.

References Cited

UNITED STATES PATENTS

| | | |
|---|---|---|
| 2,150,437 | 3/1939 | Gilbert. |
| 2,278,701 | 4/1942 | Karr _____ 134—99 XR |
| 2,310,585 | 2/1943 | Lawson. |
| 2,491,194 | 12/1949 | McShea _____ 134—107 XR |
| 2,527,666 | 10/1950 | Winter _____ 134—94 XR |
| 2,664,901 | 1/1954 | Gehr et al. _____ 134—105 |

ROBERT L. BLEUTGE, Primary Examiner

U.S. Cl. X.R.

228—19; 266—6